Feb. 20, 1945.     J. V. DYRR     2,369,725
RELEASE MEANS
Filed Oct. 30, 1942     2 Sheets-Sheet 1
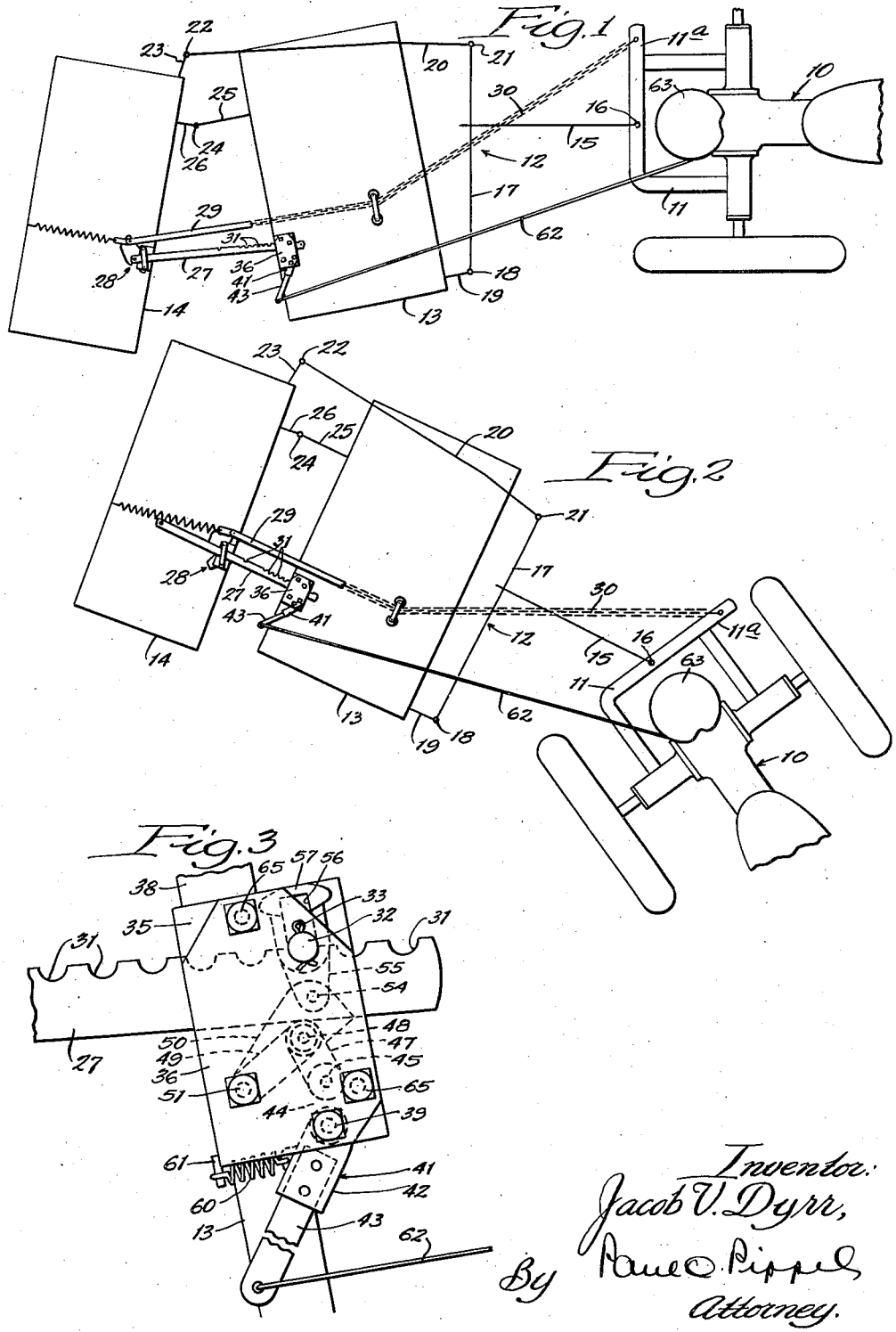

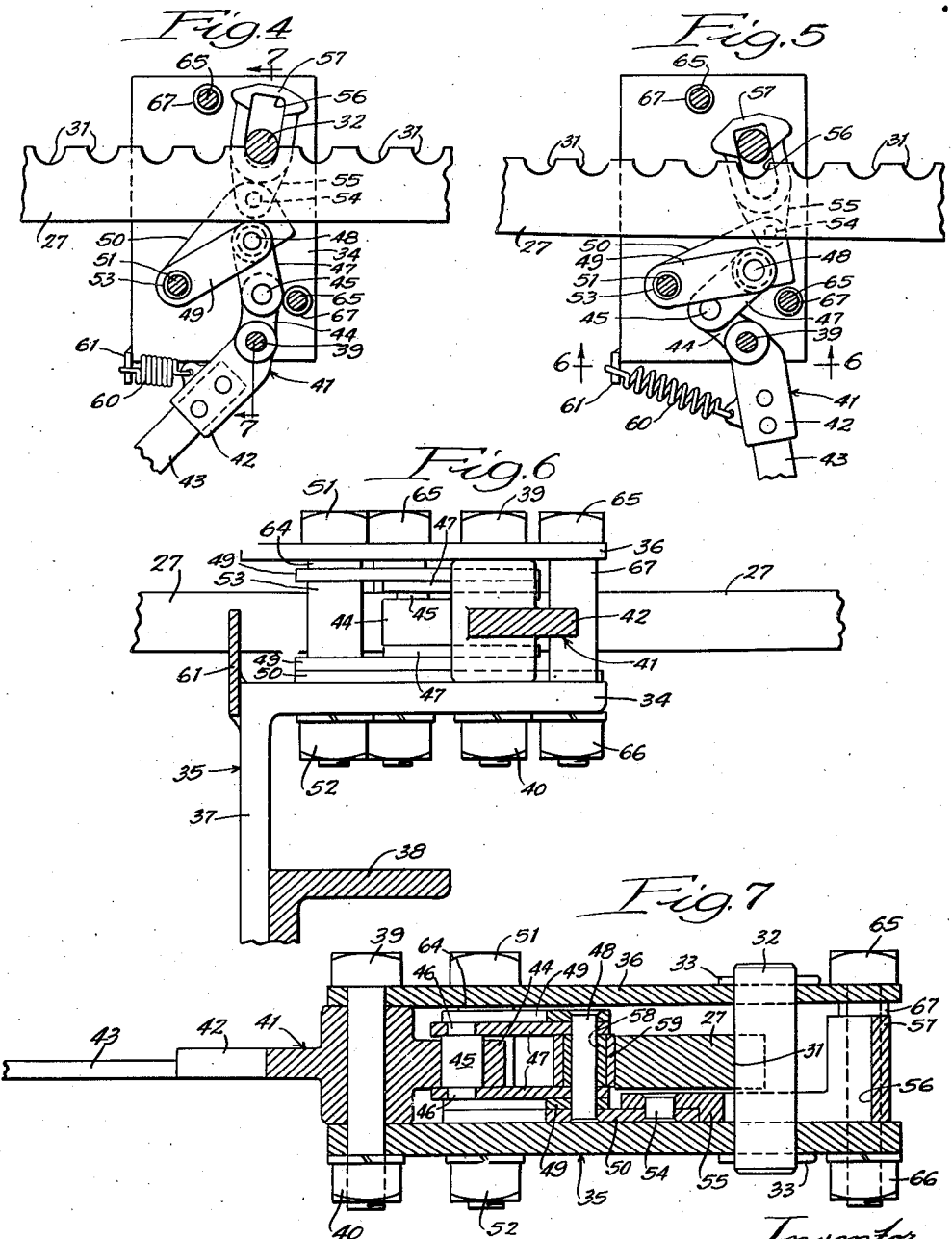

Patented Feb. 20, 1945

2,369,725

UNITED STATES PATENT OFFICE 2,369,725

RELEASE MEANS

Jacob V. Dyrr, Bell, Calif., assignor to International Harvester Company, a corporation of New Jersey Application October 30, 1942, Serial No. 463,946

6 Claims. (Cl. 55—83)

This invention relates to a release means. More specifically it relates to a release for a lock for a harrow.

It is known to provide an offset harrow with a control bar and a lock therefor for holding the gangs against relative movement. Normally, the control bar has a plurality of notches, any of which is engageable with an element on one of the gangs for fixing the gangs relative to one another in any of a plurality of positions of adjustment. When the gangs are to be adjusted with respect to one another, the control bar is shifted out of engagement with the element. Frequently, because of forces acting between the control bar and gangs, it is difficult to release the element from the notches of the control bar. The present invention has to do with means for positively effecting such a release.

An object of the present invention is to provide an improved control means.

A further object is the provision of an improved means for releasing tools held in fixed position with respect to one another.

Another object is to provide an improved means for positively releasing the gangs of a harrow from a locked condition.

Other objects will appear from the disclosure.

According to the present invention, a harrow composed of two gangs is provided with means for holding the gangs against relative movement, said means being composed of a notched control bar and an element engaging the notched bar. For release of the notched bar from the element, there is provided a slotted part embracing the element and being movable to engage the control bar and thereby to cause its release from the element.

In the drawings:

Figure 1 is a plan view of a tractor and an offset harrow connected thereto in working position, the harrow being provided with the novel release means of the present invention;

Figure 2 is a plan view of the harrow and tractor of Figure 1, the harrow being in position for a turn to the right;

Figure 3 is a plan view showing the control bar of the harrow and the novel release means of the present invention, the control bar being in locked position;

Figure 4 is a plan view with parts removed of the release means and the control bar in locked position;

Figure 5 is a plan view with parts removed of the release means and control bar in released position;

Figure 6 is a sectional view taken on the line 6—6 of Figure 5; and

Figure 7 is a sectional view taken on the line 7—7 of Figure 4.

As shown in Figures 1 and 2, a tractor 10 has a U-shaped draw-bar 11, to which is connected by means of a hitch frame 12 an offset harrow composed of a front gang 13 and a rear gang 14. The hitch frame 12 is composed of a longitudinal member 15 pivotally connected at 16 to the tractor draw-bar 11 and a transverse bar 17 rigidly secured to the longitudinal bar 15 and pivotally connected to one end of the front gang 13 at 18 upon an extension 19 of the front gang. A pull bar 20 pivotally connected at 21 to the other end of the transverse bar 17 of the hitch frame 12 directly connects the hitch frame 12 with the rear frame 14 through a pivotal connection 22 with a transverse extension 23 of the rear frame. The gangs 13 and 14 are pivotally connected at 24 by means of parts 25 and 26 extending respectively rearwardly and forwardly from the gangs. In the working position of Figure 1, the harrow and tractor are normally moved in a straight line forwardly, and the gangs are correctly positioned for a turn to the left. When the harrow is to be turned to the right, however, the gangs must be shifted to the relative position shown in Figure 2. A control bar 27 connected with the rear gang 14 by means 28 holds the gangs in the position shown in Figure 1. The means 28 is not shown in detail in the present application, since it forms no part of the present invention, but it is claimed and shown more fully in applicant's Patent No. 2,358,496. It is sufficient to state that the means is connected by a rod 29 and chain 30 with an offset extension 11a of the tractor draw-bar 11, so that when the tractor is turned to the right, as illustrated in Figure 2, the consequent pull exerted by the draw-bar extension 11a through the chain 30 and rod 29 causes release of the means 28, so that the rear gang 14 may move forwardly with respect to the control bar 27 and the front gang 13.

The control bar 27 is connected with the front gang 13 by means illustrated in Figures 3 to 7, inclusive. As seen in these figures, the control bar 27 has a plurality of notches 31, any of which may engage a circular pin-like member 32 held by cotter pins 33 to extend between a horizontal leg 34 of an angle member 35 and a plate 36, as shown in Figure 7. The angle member 35 has a vertical leg 37 secured to a frame member 38 forming part of the front gang 13. Pivotally mounted between the angle member 35 and the plate 36 upon a bolt 39 secured by a nut 40 is a casting 41. The casting 41 has a sleeve portion 42 in which is secured a lever 43. The casting 41 has a portion 44 in which is pivotally mounted a bearing 45 connected by reduced ends 46 to a pair of links 47. The pair of links 47 is pivotally connected by a rivet 48 to a pair of upper and lower narrow links 49 and a lower wide link 50, all pivoting upon a bolt 51 extending through and secured to the angle member 35 in the plate 36 by a nut 52. A spacing sleeve 53 upon the bolt 51 keeps the upper and lower narrow links 49 apart. There is pivotally connected to the wide link 50, by means of a rivet 54, a dual function part 55. The part 55 has an elongated slot 56 embracing the member 32 and an upstanding portion 57 at one end. Upon the rivet 48 between the upper and lower narrow links 47 is mounted a sleeve 58 and upon the sleeve 58 a sleeve 59 engaging one side of the control bar 27. The sleeves 58 and 59 serve to space the upper and lower narrow links 47 from one another, and the sleeve 59 engages the one side of the control bar 27 so as to maintain any of the notches 31 in engagement with the member 32, as illustrated in Figures 4 and 7. As shown in Figure 4, a spring 60 connected to the casting 41 and an upstanding piece 61 secured, as by welding, to the angle member 35 maintain the casting 41 in the position shown in Figure 4. The casting 41 and the links 47 act as a toggle mechanism which is in its over-center locked position, as shown in Figure 4. Thus the sleeve 59 is held against the control bar 27 to maintain one of the notches 31 in engagement with the member 32, so that there can be no relative movement between the control bar 27 and the front gang 13, and the gangs 13 and 14 are held against relative movement.

When it is desired to release the gangs 13 and 14 so that they may be moved, for example, from the working position of Figure 1 to a working position of smaller angle or to transport position, a pull is exerted by an operator upon a cord 62 extending within easy reach of an operator's seat 63 upon the tractor 10 and connected to the lever 43 so as to swing the lever 43 and casting 41 in a counterclockwise direction about the bolt 39 as a pivot. The toggle mechanism formed by the casting 41 and links 47 is released and the narrow links 41, the wide link 50, and the sleeve 59 are moved downward, as shown in Figure 5, so that the sleeve 59 is moved away from the control bar 27. The movement of the wide link 50 causes a movement of the part 55, so that the upstanding portion 57 thereof is brought into engagement with the side of the control bar 27. This causes a positive movement of the control bar 27 away from the member 32, and thus there is a positive release of the member 32 from the notch 31 of the control bar 27 engaged by it. Figure 3 shows the start of the counterclockwise movement of the lever 43 and the casting 41, just described. In the first part of this movement, the sleeve 59 is moved away from the control bar 27 before the control bar 27 moves out of engagement with the member 32. In many instances, the control bar 27 will automatically become disengaged from the member 32 upon movement of the sleeve 59 away from the control bar 27, but it frequently happens that because of the forces acting through the control bar 27 between the gangs 13 and 14, this disengagement will not take place by itself. This disengagement is positively effected by the upstanding portion 57 of the upstanding part 15.

The member 55 has been referred to as a dual function part because the enlarged portion 57 thereof abuts and moves the notched member 27 out of engagement with the notch engaging member 32 and because additionally the end of the slot 56 in the member 55 serves as a stop to limit the movement of the bar 27 under the influence of the portion 57.

The plate 36 is held in spaced relation to the horizontal leg 34 of the angle member 35 by means of the casting 41. This is also done by the links 49 and 50, the sleeve 53, and a washer 64 mounted upon the bolt 51, which secures the plate 36 to the horizontal leg 34. The plate 36 is also held in spaced relation to the horizontal leg 34 of the angle member 35 by bolts 65 secured by nuts 66 and sleeves 67 mounted upon the bolts 65.

It will be apparent from the foregoing description that a new and novel means has been provided for positively releasing a control bar extending between gangs of an offset harrow from one gang. Although this means is illustrated in conjunction with an offset harrow, it will be apparent that it may be also applied for releasing from locked position any two parts, such as two tools.

The intention is to limit the invention only within the scope of the appended claims.

What is claimed is:

1. In a construction comprising two tools connected with one another for relative movement and means for fixing the tools against relative movement, said means comprising a first member connected with one tool and a second member connected with the other tool and having a plurality of notches engageable with the first member for fixing the tools against relative movement in any of a plurality of positions of adjustment, one member being stationary and the other member movable, and disengagement of the first member from the notches of the second member being effected by movement of the movable member away from the stationary member, the combination therewith of means for moving the movable member away from the stationary member, said means comprising a part having a slot embracing the stationary member and a portion engageable with the movable member, and means for moving the part to cause the said portion thereof to engage the movable member to move the same out of engagement with the stationary member, engagement of the end of the slot in the part with the stationary member limiting the movement of the part.

2. In a structure comprising a pair of harrow gangs connected for relative movement and means for fixing the harrow gangs against relative movement, said means comprising a control bar connected at one end to one gang and having a plurality of notches adjacent the other end, and an element mounted upon the other gang and adapted to engage the control bar in any of the plurality of notches thereof for holding the harrow gangs in any of a plurality of positions of adjustment, disengagement of the control bar from the notches being effected by movement of the control bar away from the element, the combination therewith of means for moving the control bar away from the element, said means comprising a part having a slot embracing the element and a portion engageable with the control bar, and means for moving the part to cause the said portion thereof to engage the control bar to move the same, engagement of the end of the slot in the part with the element limiting the movement of the part.

3. In a structure comprising a pair of harrow gangs connected for relative movement and means for fixing the harrow gangs against relative movement, said means comprising a control bar connected at one end to one gang and having a plurality of notches in one side adjacent the other end, and an element mounted upon the other gang and adapted to engage the control bar in any of the plurality of notches thereof for holding the harrow gangs in any of a plurality of positions of adjustment, disengagement of the control bar from the notches being effected by lateral movement of the control bar away from the element, the combination therewith of means for moving the control bar away from the element, said means comprising a part extending beneath the control bar and having a slot embracing the element and an upstanding portion engageable with the said one side of the control bar, and means positioned at the other side of the control bar for moving the part to cause the said upstanding portion thereof to engage the control bar to move the same, engagement of the end of the slot in the part with the element limiting the movement of the part.

4. In a structure comprising a pair of harrow gangs connected for relative movement and means for fixing the harrow gangs against relative movement, said means comprising a control bar connected at one end to one gang and having a plurality of notches adjacent the other end, an element mounted upon the other gang and adapted to engage the control bar in any of the plurality of notches thereof for holding the harrow gangs in any of a plurality of positions of adjustment, and a holding piece mounted at the other side of the control bar for holding the same in engagement with the element, the combination therewith of means for moving the control bar out of engagement with the element, said means comprising a part positioned beneath the control bar and extending from opposite sides thereof so as to be connected at the said other side of the control bar with the holding piece and so as to present at the said one side of the control bar an upstanding portion adapted to engage the said one side of the control bar and having a slot embracing the element, and means connected with the holding piece for moving the holding piece away from the said other side of the control bar and for moving the part to cause the upstanding portion thereof to engage the said one side of the control bar to move the control bar out of engagement with the element, engagement of the end of the slot in the part with the element limiting the movement of the part.

5. In a structure comprising a pair of harrow gangs connected for relative movement and means for fixing the harrow gangs against relative movement, said means comprising a control bar connected at one end to one gang and having a plurality of notches adjacent the other end, an element mounted upon the other gang and adapted to engage the control bar in any of the plurality of notches thereof for holding the harrow gangs in any of a plurality of positions of adjustment, a holding piece mounted at the other side of the control bar for holding the same in engagement with the element, and spring-controlled toggle means acting against the holding means, the combination therewith of means for moving the control bar out of engagement with the element, said means comprising a part positioned beneath the control bar and extending from opposite sides thereof so as to be connected at the said other side of the control bar with the holding piece and so as to present at the said one side of the control bar an upstanding portion adapted to engage the said one side of the control bar and having a slot embracing the element, and means for releasing the toggle means to move the holding piece away from the said other side of the control bar and to move the part to cause the upstanding portion thereof to engage the control bar to move it out of engagement with the element, engagement of the end of the slot in the part with the element limiting the movement of the part.

6. In a construction comprising two tools connected with one another for relative movement and means for fixing the tools against relative movement, said means comprising a notched member connected with one tool and a notch-engaging member connected with the other tool and engageable with the notched member for fixing the tools against relative movement in any of a plurality of positions of adjustment, one member being stationary and the other member movable, and disengagement of the notched member from the notch-engaging member being effected by movement of the movable member away from the stationary member, the combination therewith of means for moving the movable member away from the stationary member, said means comprising a toggle link having a sleeve portion at one end thereof to engage and hold the movable member engaged with the stationary member when the toggle link is extended, means movable by the toggle link and connected swingably therewith, said last means comprising a dual function part to engage and move the movable member away from the stationary member when the toggle link is collapsed and its end sleeve is retracted from the movable member and to limit the movement of said movable member to a predetermined disengaged stop position.

JACOB V. DYRR.